2,902,506

METHYLDIHALOGENOSILANE PREPARATION

Alfred R. Gilbert and Glenn D. Cooper, Schenectady, N.Y., assignors to General Electric Company, a corporation of New York No Drawing. Application April 18, 1956
Serial No. 578,900

8 Claims. (Cl. 260—448.2)

This invention relates to a method of preparing methyldihalogenosilanes. More particularly, this invention is concerned with the method of preparing monomethyldihalogenosilanes which comprises redistributing a methyltrihalogenosilane with a preformed silane having the formula (1) $(CH_3)_a SiH_{4-a}$ in the presence of aluminum chloride at a temperature of from room temperature up to about 200° C. In the above formula $a$ is an integer equal to from 1 to 3, inclusive.

In the preparation of organosilicon compounds by conventional methods, it is common to pass methyl halide vapors over elemental silicon or a silicon alloy to form organosilicon compounds containing both silicon-bonded halogen radicals and silicon-bonded methyl radicals. In the most common method of preparing these compounds, methyl chloride is passed over silicon in the presence of a catalyst at elevated temperatures to form mixtures of methylchlorosilanes. These methylchlorosilanes comprise methyltrichlorosilane, dimethyldichlorosilane and trimethylchlorosilane. Although all of these methylchlorosilanes are useful in the formation of silicone oils, resins, and elastomers, difunctional silanes (e.g. dimethyldichlorosilane) have been found to be the most useful and versatile of these methylhalogenosilanes. However, it is often desirable to obtain methylhalogenosilanes which also contain silicon-bonded hydrogen atoms. The presence of a silicon-bonded hydrogen atom in the organosilane enhances the water repellent properties of silicone materials prepared from these silanes.

In our copending application Serial No. 553,744, filed December 19, 1955, and assigned to the same assignee as the present invention, there is described a method of reducing organohalogenosilanes to organosilanes containing silicon-bonded hydrogen atoms. This reduction is accomplished by effecting reaction between the organohalogenosilane and sodium hydride. By the process of this copending application, for example, methyltrichlorosilane, is converted to methyldichlorosilane, methylchlorosilane and methylsilane. Similarly, dimethyldichlorosilane is reduced to dimethylchlorosilane and dimethylsilane. By the process of this copending application, the principal product of the reduction reaction is the completely reduced organosilane. Thus, where the compound being reduced is methyltrichlorosilane, the principal product is methylsilane. Thus, this copending application provides an efficient method for preparing organosilicon compounds in which the four valences of silicon are satisfied by methyl groups and hydrogen.

Among the organosilanes containing silicon-bonded hydrogen atoms which are prepared by the method of our copending application are those compounds within the scope of Formula 1 above. It is observed that the compounds within the scope of Formula 1 contain no hydrolyzable halogen groups. Because of the limited utility of these non-halogen containing organosilicon compounds, it is desirable to convert them into methyldihalogenosilanes. Because of their two silicon-bonded halogens and their silicon-bonded hydrogen atom, these methyldihalogenosilanes may be used in the preparation, by conventional methods, of organopolysiloxane elastomers, gums, fluids and resins containing silicon-bonded hydrogen atoms. Materials of this type have been found to be far more effective in water-proofing applications than the corresponding organopolysiloxanes containing no silicon-bonded hydrogen atoms.

Unexpectedly we have found that by redistributing a methyltrihalogenosilane with a preformed compound within the scope of Formula 1 in the presence of aluminum chloride, a large yield of a methyldihalogenosilane is obtained. This result is entirely unexpected and the high yield of product obtained could in no way be predicted from statistical data.

When considering the disproportionation reaction of the present invention in the light of the reaction disclosed in our aforementioned copending application, it is seen that a two-step method is provided for converting the readily available methyltrichlorosilane into the highly desirable methyldichlorosilane. Thus, methyltrichlorosilane is reduced to methylsilane by sodium hydride and the methylsilane is then reacted with additional methyltrichlorosilane in the presence of aluminum chloride to yield methyldichlorosilane. The reaction described above is the preferred reaction of the present invention although other compounds within the scope of Formula 1 may be employed in the disproportionation reaction with the same resulting formation of a methyldihalogenosilane.

Among the compounds embraced by Formula 1 are, for example, methylsilane, dimethylsilane, and trimethylsilane. In addition to using only one preformed compound within the scope of Formula 1, the redistribution reaction of the present invention may also be carried out using more than one of these compounds.

Although the exact mechanism of the redistribution reaction involved in the present invention is not completely understood, it is known that the reaction is a liquid phase reaction and does not proceed satisfactorily in the vapor phase.

The ratio of the number of moles of the methyltrihalogenosilane to the number of moles of material within the scope of Formula 1 may vary within extremely wide limits. Satisfactory results are obtained when employing equimolar amounts of the two types of ingredients or with molar excesses of the methyltrihalogenosilane up to 10 or more moles of the methyltrihalogenosilane per mole of the compound of Formula 1. Our preferred ratio of the two ingredients is about 3 to 6 moles of the methyltrihalogenosilane per mole of the compound of Formula 1.

As is the case with most catalyzed reactions, the rate of reaction is affected by the amount of catalyst present; the more catalyst available, the faster the reaction proceeds. The amount of catalyst is not critical and we have obtained satisfactory rates of reaction employing from about 1 to 20 percent of catalyst based on the combined weight of the silicon compounds in the reaction mixture. However, for most efficient reaction we prefer to employ from about 1 to 10 percent by weight of the aluminum chloride based on the sum of the weights of the silicon compounds.

The reaction of the present invention may be carried out at temperatures which vary from as low as room temperature (i.e., about 25° C.), up to about 200° C. Since the rate of reaction is dependent on temperature to some extent, we prefer to carry out our reaction at an elevated temperature and have found 100 to 125° C. provides desirable operating conditions. At temperatures much above 200° C. it is found that the catalyst will tend to function as a disproportionation catalyst for the silicon compounds as well as a redistribution catalyst.

Since many of the reactants and reaction products employed in the process of the present invention have boiling points at atmospheric pressure below the reaction temperature, we prefer to carry out our reaction in a closed vessel so as to preclude the loss of reactants or products. The pressure in this closed vessel will vary with the composition of the starting materials and the temperature of the reactions.

In carrying out the process of the present invention, the methyltrihalogenosilane, the compound of Formula 1, and the aluminum chloride are placed in a suitable closed reaction vessel and the reaction vessel is then maintained at reaction temperature until the reaction is completed. Since the time of reaction depends on the reaction temperature, the degree of agitation, the specific reactants employed, the proportions of reactants employed, and the concentration of catalyst, it is impossible to specify a particular time of reaction. However, we have observed satisfactory degrees of redistribution when employing reaction times which vary from one hour up to 24 hours or more.

In order that those skilled in the art may better understand how the present invention may be practiced, the following examples are given by way of illustration and not by way of limitation.

In all of the following examples, the methyltrihalogenosilane and the aluminum chloride were added to a heavy wall stainless steel reaction bomb. The bomb was then securely closed, cooled in liquid nitrogen and evacuated. The desired amount of the compound within the scope of Formula 1 was then added to the bomb and the bomb was resealed. The bomb was then warmed to the reaction temperature and maintained at this temperature with shaking during the course of the reaction. After the specified time of reaction, the bomb was removed and immersed in ice water. The products were separated by distillation in a low temperature Podbielniak column and the identities of the products were established by means of their infrared spectra and boiling points.

EXAMPLE 1

The procedure described above was followed in the redistribution of methyltrichlorosilane with methylsilane employing aluminum chloride as the catalyst and employing a reaction temperature of 100° C. The table below lists the mole ratio of methyltrichlorosilane to methylsilane employed in the reaction, the weight percent of aluminum chloride based on the combined weight of the two silicon compounds and the time of the reaction in hours. In addition, the table lists the percentages of silicon-bonded hydrogen atoms recovered in the reaction products based on the number of silicon-hydrogen linkages which were present in the starting materials. The table also lists the composition, in mole percent, of the compounds in the product containing silicon-bonded hydrogens.

EXAMPLE 2

This example illustrates the reaction of the present invention carried out at room temperature. After loading the reaction bomb with 6 moles of methyltrichlorosilane per mole of methylsilane and 5.9 percent by weight of aluminum chloride based on the weight of the organosilicon compounds, the bomb was allowed to warm up to room temperature (i.e. about 25% C.), and was maintained at this temperature for 24 hours. At the end of this time the reaction products were distilled to yield 93 percent of the the starting number of silicon-hydrogen linkages and the composition containing these silicon-hydrogen linkages consisted of 23.2 mole percent of methyl silane, 43.8 mole percent of methylchlorosilane and 33.0 mole percent of methyldichlorosilane.

EXAMPLE 3

The procedure of Example 1 was followed employing 4 moles of methyltrichlorosilane per mole of dimethylsilane with 5.2 percent by weight of aluminum chloride based on the total weight of the organosilicon compounds. After heating this mixture for 17 hours at 100° C. the reaction mixture was fractionally distilled to yield compounds containing 79 percent of the number of silicon-hydrogen linkages charged to the reaction mixture. Analysis of these compounds containing silicon-hydrogen linkages revealed a composition of 3.7 mole percent methylchlorosilane and 96.3 mole percent of methyldichlorosilane.

EXAMPLE 4

The procedure of Example 1 was followed employing 6 moles of methyltrichlorosilane per mole of trimethylsilane with 4.9 percent by weight of aluminum chloride based on the weight of the organosilicon compounds. This reaction mixture was heated to a temperature of 100° C. and maintained at this temperature for 18 hours. At the end of this time the reaction mixture was distilled and yielded a fraction containing 82.5 percent of the silicon-hydrogen linkages available from the starting materials. This fraction was essentially pure methyldichlorosilane.

Although the foregoing examples have described the process of the present invention employing only a single material, aluminum chloride, as a redistribution catalyst, we have found that the process can also be carried out with ferric chloride in place of aluminum chloride. However, ferric chloride is inferior to aluminum chloride in the process. Similarly, the foregoing examples have described redistribution reactions using only a single silicon compound within the scope of Formula 1. It should be understood that more than one of these silicon hydrides can be employed in a given reaction mixture.

The methyldihalogenosilanes prepared by the method of the present invention can be hydrolyzed alone or with other organohalogenosilanes to form organopolysiloxanes containing both alkyl and hydrogen bonded to silicon. Thus, methyldichlorosilane can be cohydrolyzed with di-

*Table I*

| Run No. | Mole Ratio $CH_3SiCl_3$ to $CH_3SiH_3$ | $Al_2Cl_6$, Wt. Percent | Time, hr. | Percent SiH Recovered | SiH Product Composition, Mole Percent | | |
|---|---|---|---|---|---|---|---|
| | | | | | $CH_3SiH_3$ | $CH_3SiH_2Cl$ | $CH_3SiHCl_2$ |
| 1 | 6:1 | 5.5 | 47 | 79 | 0 | 3.8 | 96.2 |
| 2 | 6:1 | 5.3 | 17 | 83 | 0 | 7.8 | 92.2 |
| 3 | 6:1 | 5.6 | 3 | 87 | 1.8 | 17.1 | 81.1 |
| 4 | 6:1 | 5.5 | 1 | 91 | 2.9 | 24.8 | 72.2 |
| 5 | 6:1 | 1.2 | 1 | 91 | 17.0 | 39.3 | 43.7 |
| 6 | 6:1 | 9.6 | 1 | 86 | 0 | 9.0 | 91.0 |
| 7 | 3:1 | 5.6 | 18 | 90 | 1.6 | 18.2 | 80.3 |
| 8 | 6:1 | 10.0 | 3 | 82 | 0.6 | 8.0 | 91.4 | methyldichlorosilane and methyltrichlorosilane in the presence of water and a suitable solvent such as toluene to form organopolysiloxane resins containing both silicon-bonded methyl and silicon-bonded hydrogen atoms. This siloxane hydrolysate can then be used to waterproof fabrics. Thus, the hydrolysate can be used to impregnate a fabric and the resultant impregnated fabric can be cured by heating at a temperature of 100–150° C. in the presence of a suitable organopolysiloxane curing catalyst.

What we claim as new and desire to secure by Letters Patent of the United States is:

1. The process of forming methyldichlorosilane which consists essentially of effecting reaction in the presence of aluminum chloride between methyltrichlorosilane and a preformed silicon compound having the formula $$(CH_3)_a SiH_{4-a}$$

where $a$ is an integer equal to from 1 to 3, inclusive, said aluminum chloride being present in an amount equal to from 1 to 20 percent by weight based on the weight of said methyltrichlorosilane and said preformed silicon compound.

2. The process of forming methyldichlorosilane which consists essentially of redistributing methylsilane and methyltrichlorosilane in the presence of from 1 to 20 percent by weight of aluminum chloride, based on the weight of said methylsilane and said methyltrichlorosilane.

3. The process of preparing methyldichlorosilane which consists essentially of redistributing methyltrichlorosilane and dimethylsilane in the presence of from 1 to 20 percent by weight of aluminum chloride, based on the weight of said methyltrichlorosilane and said dimethylsilane.

4. The process of preparing methyldichlorosilane which consists essentially of redistributing methyltrichlorosilane and trimethylsilane in the presence of from 1 to 20 percent by weight of aluminum chloride, based on the weight of said methyltrichlorosilane and said trimethylsilane.

5. The process of forming methyldichlorosilane which consists essentially of effecting reaction in the presence of aluminum chloride between methyltrichlorosilane and a preformed silicon compound having the formula $$(CH_3)_a SiH_{4-a}$$

where $a$ is an integer equal to from 1 to 3, inclusive, said methyltrichlorosilane being present in an amount equal to from 3 to 6 moles per mole of said preformed silicon compound, and said aluminum chloride being present in an amount equal to from 1 to 20 percent by weight based on the weight of said methyltrichlorosilane and said preformed silicon compound.

6. The process of claim 5 in which the preformed silicon compound is methylsilane.

7. The process of claim 5 in which the preformed silicon compound is dimethylsilane.

8. The process of claim 5 in which the preformed silicon compound is trimethylsilane.

References Cited in the file of this patent

UNITED STATES PATENTS 2,786,861    McEntee _____ Mar. 26, 1957

OTHER REFERENCES

Whitmore et al.: "Amer. Chem. Soc., Jour.," vol. 69 (1947), pp. 2108–2110.